(12) United States Patent
Menosky et al.

(10) Patent No.: US 6,319,134 B1
(45) Date of Patent: Nov. 20, 2001

(54) ALUMINUM DRIVE SHAFT

(75) Inventors: Marc M. Menosky, Auburn Hills; Mark S. Barrett, Orion, both of MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/027,082

(22) Filed: Feb. 20, 1998

Related U.S. Application Data

(63) Continuation of application No. 08/743,400, filed on Nov. 1, 1996, now abandoned.

(51) Int. Cl.$^7$ .................................................. F16C 3/00
(52) U.S. Cl. ........................ 464/183; 464/180; 181/209
(58) Field of Search .................................. 464/179, 183, 464/180; 138/121, 172, 177, DIG. 5; 74/492; 29/DIG. 41; 181/207, 208, 209

(56) References Cited

U.S. PATENT DOCUMENTS

| | | | | |
|---|---|---|---|---|
| 1,291,388 | * | 1/1919 | Bright et al. .................... | 464/179 X |
| 1,765,709 | * | 6/1930 | Withington ....................... | 464/183 X |
| 1,798,305 | * | 3/1931 | Christophersen ............... | 464/179 X |
| 2,133,091 | * | 10/1938 | Gettig ............................... | 138/172 X |
| 3,190,084 | * | 6/1965 | Moon et al. ..................... | 464/179 X |
| 3,599,757 | * | 8/1971 | Takamatsu et al. ............. | 74/492 X |
| 4,188,800 | * | 2/1980 | Fujita et al. ..................... | 464/179 |
| 4,380,443 | * | 4/1983 | Federmann et al. ............ | 464/183 |
| 4,527,978 | * | 7/1985 | Zackrisson ..................... | 464/183 |
| 4,552,544 | * | 11/1985 | Beckman et al. ............... | 464/180 X |
| 4,838,833 | * | 6/1989 | Coursin ........................... | 464/183 |
| 5,234,378 | * | 8/1993 | Helgesen et al. ............... | 464/180 |
| 5,287,768 | * | 2/1994 | Amborn et al. ................. | 464/183 |
| 5,346,432 | * | 9/1994 | Greulich et al. ................ | 464/180 |
| 5,391,113 | * | 2/1995 | Tanaka ............................ | 74/492 X |
| 5,794,982 | * | 8/1998 | Green et al. .................... | 285/258 X |
| 5,937,912 | * | 8/1999 | Ally ................................. | 138/177 |
| 6,016,843 | * | 1/2000 | Wada et al. ..................... | 138/177 X |

FOREIGN PATENT DOCUMENTS

| | | | | |
|---|---|---|---|---|
| 2914657 | * | 10/1980 | (DE) ................................. | 464/183 |
| 2066418 | * | 7/1981 | (GB) ................................. | 464/179 |

OTHER PUBLICATIONS

Merriam–Webster's Collegiate Dictionary, 10th ed., Merriam–Webster Inc, Springfield, MA, 1997, p. 375.*

* cited by examiner

*Primary Examiner*—B. Dayoan
*Assistant Examiner*—Greg Binda
(74) *Attorney, Agent, or Firm*—Reising, Ethington, Barnes, Kisselle, Learman & McCulloch, P.C.

(57) ABSTRACT

An aluminum drive shaft includes an aluminum alloy torque tube and aluminum alloy yokes that are pressed into each end section of the torque tube and welded to the end of the torque tube. Each end section is reduced in diameter and joined to a larger central section by a transition section. The end sections and transition sections are formed by swaging the ends of an aluminum alloy tube blank radially inwardly in two stages. The transition sections include an annular rib in the form of a concentric circular band located midway between inner and outer conical portions. The annular ribs stiffen the transition sections to reduce oil canning and noise.

13 Claims, 2 Drawing Sheets

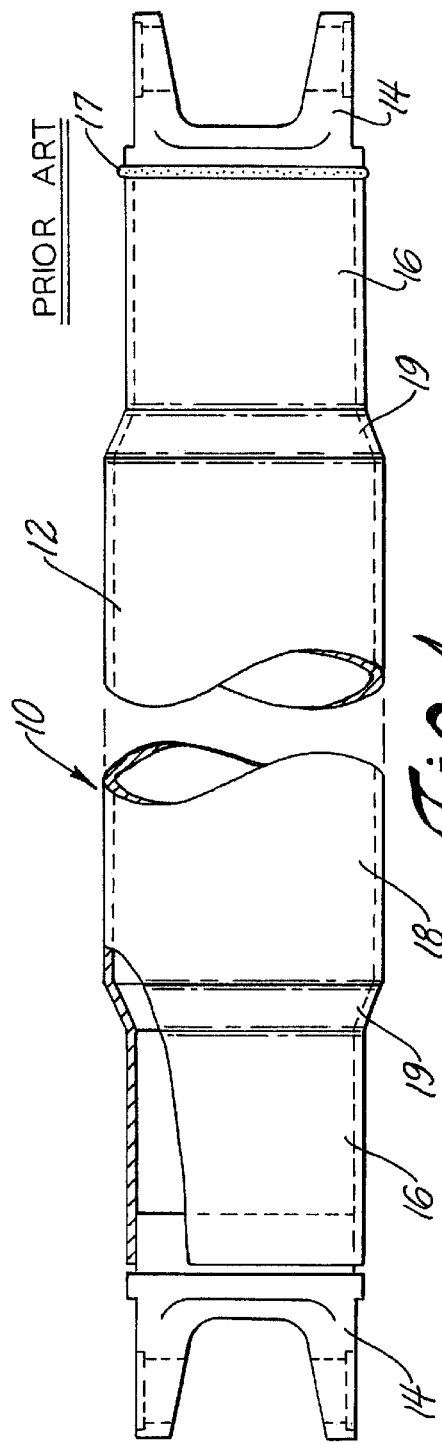
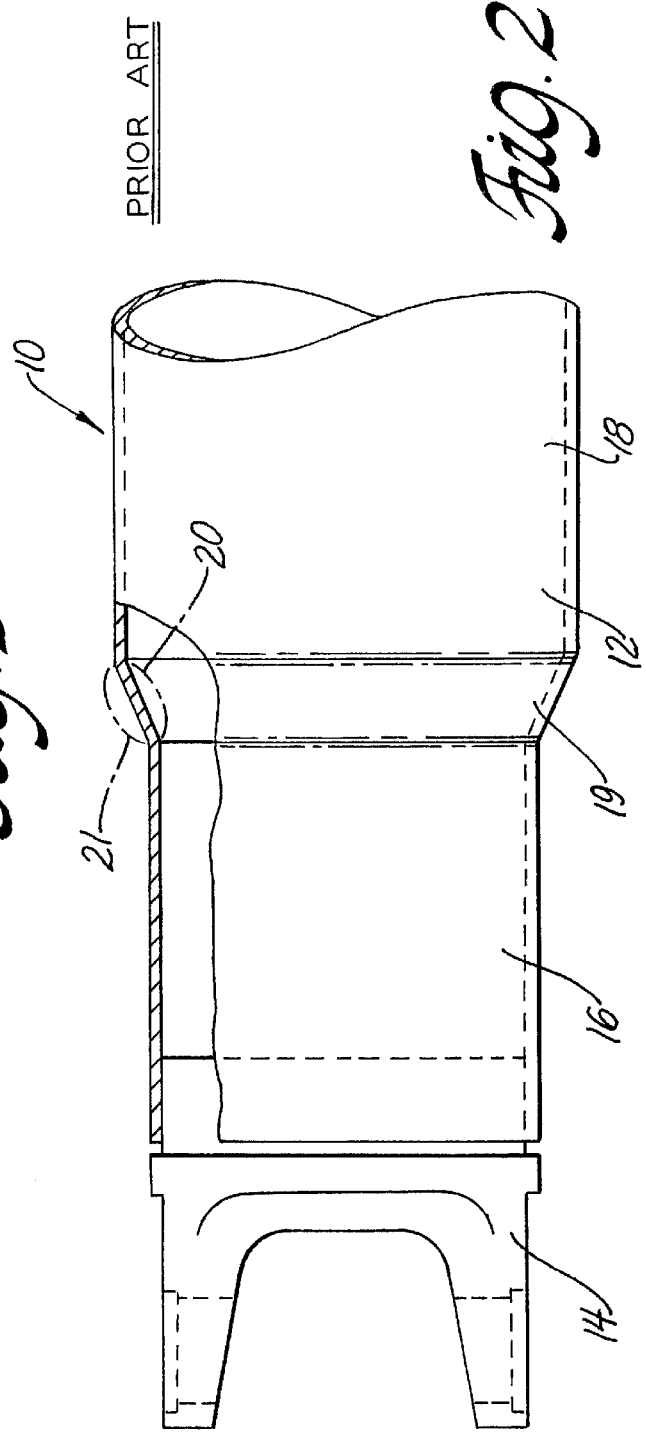

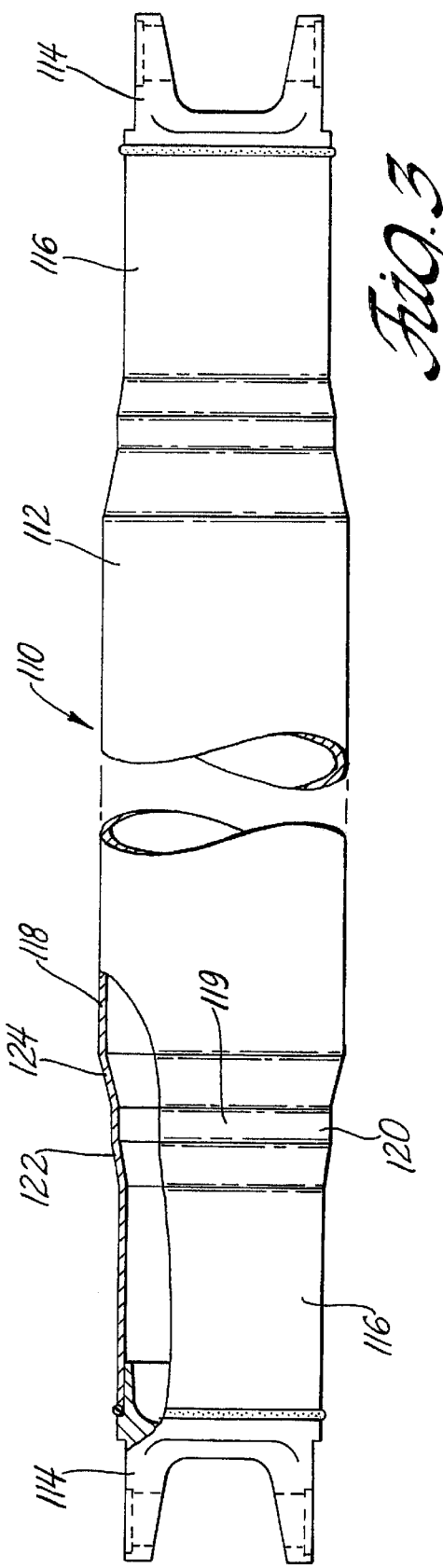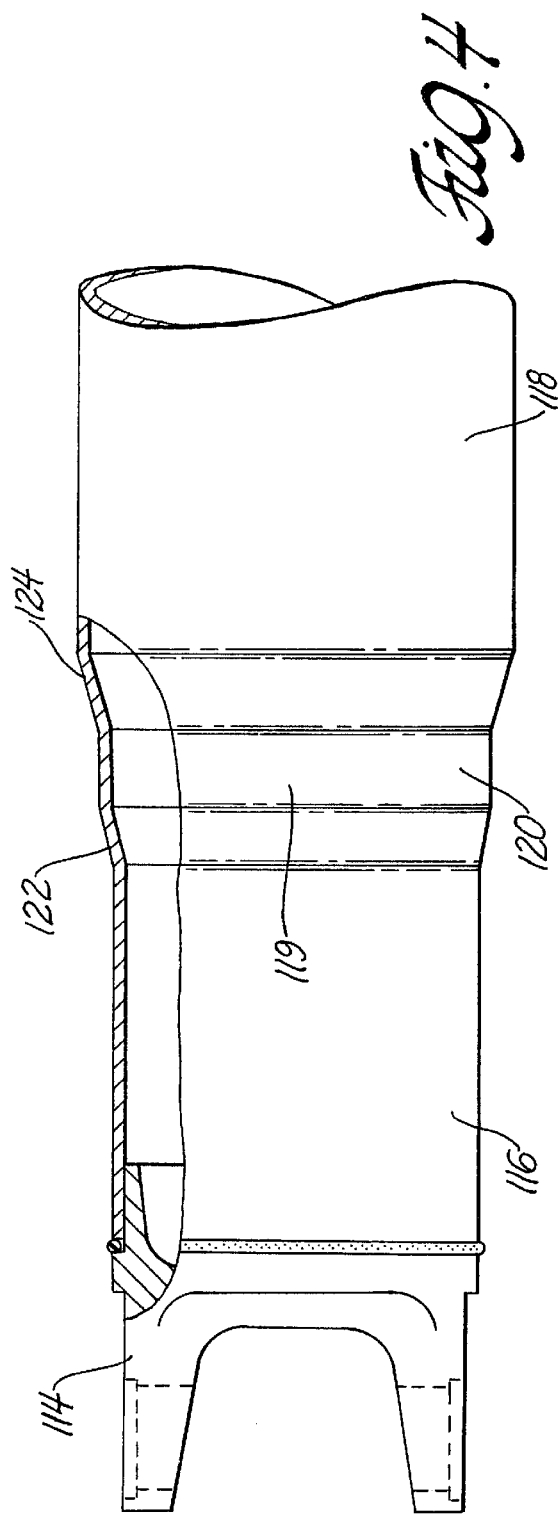

ALUMINUM DRIVE SHAFT

This is a continuation of U.S. patent application Ser. No. 08/743,400 filed Nov. 1, 1996, now abandoned.

BACKGROUND OF THE INVENTION

This invention relates generally to drive shafts for automotive vehicles and more particularly to drive shafts that comprise an aluminum torque tube and a connection member at each end of the aluminum torque tube, for connecting the drive shaft in an automotive drive line.

The use of aluminum and aluminum alloy components in place of steel components in automobiles is becoming increasingly popular because a substantial weight reduction can be realized without any sacrifice in strength or durability. Moreover aluminum components are more corrosion resistant than their steel counterparts.

U.S. Pat. No. 4,527,978 granted to Barry L. Zackrisson Jul. 9, 1985 discloses a drive shaft having a heat-treated aluminum alloy torque tube and a heat-treated aluminum alloy yoke or connection member partially telescoped within each end of the tube and joined to it by welding. The torque tube has a constant outside diameter and a wall thickness which is constant throughout most of the length. However, the wall thickness is increased adjacent each end to compensate for reduced hardness resulting from the welding operation.

Pending U.S. patent application, Ser. No. 08/692,414 filed Aug. 5, 1996, now U.S. Pat. No. 5,672,286, and assigned to the assignee of this invention also discloses a drive shaft having an aluminum torque tube and yokes at each end and a method for welding the aluminum drive shaft components to each other.

The size of the aluminum torque tube used in aluminum drive shafts for automotive drive lines is determined in part by the required length and torque capacity of the drive shaft. An aluminum torque tube having a length in the range of 5 to 6 feet, an outer diameter of 5 inches, and a wall thickness of 0.083 inches is typical The 5.0 inch outer diameter is larger than a comparable steel drive shaft. However, the end sections of the 5.0 inch outer diameter tube can be reduced in diameter and smaller yokes or other connection members can be used at each end. This reduces space requirements at the drive shaft ends which are usually located in crowded environments. The smaller end sections and yokes also reduce weight significantly particularly when the entire drive shaft assembly is taken into account. The end sections are usually reduced by swaging a larger diameter tube blank.

While such aluminum drive shafts have been found to be generally satisfactory, experience has shown that noise problems are encountered occasionally when thin walled tubes are used. One such noise problem is periodic tinkling sound initiated by torque reversal when the torque tube has conical transition sections. We have determined that such a sound is due to an instability phenomenon in the conical transition sections which we characterize as oil canning and which we have found is related to the wall thickness of the aluminum tube.

SUMMARY OF THE INVENTION

The object of this invention is to provide an aluminum drive shaft comprising a thin walled aluminum torque tube that has reduced diameter end sections that are connected to a larger diameter central section by transition sections that are stable under all normal operating conditions.

A feature of the invention is that the aluminum drive shaft includes a thin walled aluminum torque tube that has reduced diameter end sections that are connected to a larger diameter central section by transition sections that have an annular rib to stiffen the transition sections so as to reduce oil canning and noise.

Another feature of the invention is that the aluminum drive shaft includes a thin walled aluminum torque tube that has reduced diameter end sections that are connected to a larger diameter central section by transition sections that are formed with a concentric cylindrical band located between inner and outer conical portions to stiffen the transition sections so as to reduce oil canning and noise.

Yet another feature of the invention is that the aluminum drive shaft includes a thin walled aluminum torque tube that has reduced diameter end sections that are of sufficient length for use in balancing the aluminum drive shaft.

Still yet another feature of the invention is that the aluminum drive shaft includes an aluminum torque tube that has reduced end sections and transition sections that are formed by swaging the ends of an aluminum tube blank radially inwardly.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 1 is a partially sectioned longitudinal view of a known drive shaft assembly having aluminum components including an aluminum torque tube;

FIG. 2 is an enlarged fragmentary sectional view of the drive shaft of FIG. 1 showing a reduced end portion and transition portion in detail;

FIG. 3 is a partially sectioned longitudinal view of a drive shaft assembly having aluminum components including an aluminum torque tube in accordance with the invention; and FIG. 4 is an enlarged fragmentary sectional view of the drive shaft assembly of FIG. 3 showing a reduced end portion and transition portion in detail.

DESCRIPTION OF THE INVENTION

Referring now to the drawing, FIG. 1 shows a known drive shaft 10 that comprises a tubular drive shaft or torque tube 12 having yokes 14 at each end for installing the drive shaft 10 in a motor vehicle. The torque tube 12 is made from a tube of 6061 aluminum alloy thermally treated to a T-6 condition that has a 5.0 in outer diameter and a 0.083 inch wall thickness to provide the required torque capacity and other desired operating characteristics for a drive shaft between 5 and 6 feet in length. The torque tube 12 has a cylindrical section 16 at each end that is reduced to a diameter of approximately 4.0 inches by a swaging process. This process increases the wall thickness in the end sections to about 0.093 inches. The yokes 14 which are also made of an aluminum alloy and preferably the same aluminum alloy are press fit in the reduced diameter end sections 16 and then welded to the end of tube by a circumferential weld bead 17 as shown at the right hand end in FIG. 1. Yokes 14 are used to connect drive shaft assembly 10 into an automotive drive line by well known Cardan joints. The smaller diameter end sections 16 accommodate smaller yokes 14 and reduce space requirements at the drive shaft ends which are generally located in a crowded environment. Significant weight savings are also realized particularly when the smaller Cardan or alternative universal joints are taken into account.

The cylindrical section 16 of reduced diameter at each end of the torque tube 12 is joined to the larger central section 18 by transition sections 19 that are substantially conical. These known drive shafts.10 having the torque tubes 12 perform quite satisfactorily in most instances. However, some known drive shafts produce noise occasionally, in the nature of a periodic tinkling sound which appears to be initiated by torque reversal. We have found that this periodic clinking sound is due to an instability phenomenon in the conical transition sections 19 which we characterize as oil canning.

In essence, the conical transition sections 19 bend back and forth between an inward concave shape and an outward convex shape as illustrated graphically by dashed lines 20 and 21 in FIG. 2. This oil canning phenomenon is related to the wall thickness and shear web of the transition sections 19 which in the example under consideration is nominally 0.088 inches. The likelihood of the instability occurring increases as the wall thickness of the transition section 19 decreases. We have found that the amplitude of the oil canning phenomenon that produces audible noise is in the range of about 0.030 to 0.045 inches of transition deflection.

Referring now to FIG. 3 a drive shaft 110 in accordance with the invention is disclosed. Drive shaft 110 comprises a tubular drive shaft or torque tube 112 having yokes 114 at each end for installing the drive shaft 110 in a motor vehicle. The torque tube 112 is made from a tube of 6061 aluminum alloy thermally treated to a T-6 condition having an outer diameter of approximately 5.0 inches and a wall thickness of 0.083 inches in order to provide the required torque capacity and other desired operating characteristics. The torque tube 112 has a cylindrical section 116 at each end that is reduced to an outer diameter of approximately 4.0 inches to accommodate smaller aluminum alloy yokes 114 that are pressed in each end and welded.

These cylindrical end sections 116 are preferably kept at a substantial length so that weights can be attached to the cylindrical end sections 116 to dynamically balance the drive shaft 110. The cylindrical end section 116 would typically have a length of about 4.0 inches for this purpose.

Transition sections 119 join the cylindrical sections 116 of reduced diameter at each end to the larger central section 118. These transition sections 119 are shaped to reduce oil canning significantly if and when such an instability is encountered. More specifically, the transition sections 119 include an annular stiffening rib that is located between inner and outer conical portions 122 and 124 as best shown in FIG. 4. The annular stiffening rib 120 is in the form of a concentric circular band that has a nominal outer diameter of about 4.5 inches and that is located approximately half way between the end section 116 and the central section 118 in the radial direction and in the longitudinal direction. The circular band which provides the annular stiffening rib 120 has a length of about 0.5 inches in the axial or longitudinal direction.

The end sections 116 and transition sections 119 can be formed by a swaging operation in two stages. The outer conical section 124 and a cylindrical section of about 4.5 inch outer diameter that extends to the end of the tube is formed in the first stage. The inner conical section 122 and the fully reduced end section 116 is then formed in the second stage leaving a concentric circular band midway between the inner and outer conical sections 122 and 124.

By shaping the transition section 119 in this manner we have reduced the amplitude of the oil canning significantly from a range of about 0.030–0.045 inches to a range of about 0.005–0.015 inches. This reduces any noise to a level that is not audible without any need for increasing the wall thickness of the tube blank.

While this particular transition shape performs satisfactorily for the particular drive shaft described above, other transition shapes and/or methods of forming transitions are also possible and in some other instances may be more desirable. Also while we have illustrated a torque tube which is reduced at both ends, some drive shaft applications may require a reduction at only one end section. Furthermore the invention contemplates use of other aluminum alloys and aluminum matrix materials comprising an aluminum oxide and an aluminum alloy material. In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A drive shaft for automotive vehicles having an aluminum torque tube and a drive yoke at one end of the torque tube for connecting the drive shaft in an automotive drive line for transmitting mechanical power, the aluminum torque tube comprising:

a cylindrical center section of a given diameter, a cylindrical end section of a lesser diameter than the given diameter of the cylindrical center section at the one end of the torque tube for attaching the drive yoke to the aluminum torque tube, a transition section connecting the cylindrical end section to the cylindrical center section, and the transition section having an annular stiffening rib that is spaced from the cylindrical end section and the cylindrical center section to reduce oil canning of the transition section.

2. The drive shaft as defined in claim 1 wherein the annular stiffening rib is midway between the cylindrical end section and the cylindrical center section in the radial direction.

3. The drive shaft as defined in claim 1 wherein the annular stiffening rib is midway between the cylindrical end section and the cylindrical center section in the longitudinal direction.

4. A drive shaft for automotive vehicles having an aluminum torque tube and a drive yoke at one end of the torque tube for connecting the drive shaft in an automotive drive line for transmitting mechanical power, the aluminum torque tube comprising:

cylindrical center section of a given diameter, a cylindrical end section of reduced diameter at one end of the torque tube for attaching the drive yoke to the aluminum torque tube, a transition section connecting the cylindrical end section to the cylindrical center section, the transition section having inner and outer conical portions and an annular stiffening rib in the form of a narrow concentric cylindrical band that is between the inner and outer conical portions to reduce oil canning of the transition section, the cylindrical end section and the transition section having a length, and the cylindrical center section having a length that is greater than the length of the cylindrical end section and the transition section.

5. A drive shaft for automotive vehicles having an aluminum torque tube and a drive yoke at each end of the torque tube for connecting the drive shaft in an automotive drive line for transmitting mechanical power, the aluminum torque tube comprising:

a cylindrical center section of a given diameter, a cylindrical end section of reduced diameter at the one end of the torque tube for attaching the drive yoke to the aluminum torque tube, a transition section connecting the cylindrical end section to the cylindrical center section, the transition section having inner and outer conical portions and an annular stiffening rib in the form of a narrow concentric cylindrical band that is between the inner and outer conical portions to reduce oil canning of the transition section, the concentric cylindrical band having a length of about 0.5 inches in the longitudinal direction, the cylindrical end section and the transition section having a length, and the cylindrical center section having a length that is greater than the length of the cylindrical end section and the transition section.

6. The drive shaft as defined in claim 5 wherein the torque tube is made from a tube blank having an outer diameter corresponding to the given diameter of the cylindrical center section and the cylindrical end section and the transition section are formed by swaging an end of the tube blank, and wherein the tube blank is made from a material selected from the group consisting of aluminum alloy and aluminum metal matrix.

7. The drive shaft as defined in claim 6 wherein the tube blank has an outer diameter of about 5.0 inches and a wall thickness of about 0.083 inches.

8. The drive shaft as defined in claim 7 wherein the drive yoke at the one end of the shaft is an aluminum drive yoke that is pressed into the cylindrical end section and welded to the cylindrical end section of the torque tube.

9. The drive shaft as defined in claim 8 wherein the torque tube has a second cylindrical end section of a lesser diameter than the given diameter of the cylindrical center section at an opposite end of the torque tube and a second transition section connecting the second cylindrical end section to the cylindrical center section.

10. A drive shaft for automotive vehicles having an aluminum torque tube and a drive yoke at one end of the torque tube for connecting the drive shaft in an automotive drive line for transmitting mechanical power, the aluminum torque tube comprising:

a cylindrical center section of a given diameter, a cylindrical end section of a lesser diameter than the given diameter of the cylindrical center section at the one end of the torque tube for attaching the drive yoke to the torque tube, a transition section connecting the cylindrical end section to the cylindrical center section, the transition section having an annular stiffening rib that is spaced from the cylindrical end section and the cylindrical center section, and the torque tube being thin walled and the annular stiffening rib reducing oil canning and noise in the thin walled transition section when the drive shaft is rotated.

11. A drive shaft having a torque tube and a drive yoke at one end of the torque tube, the torque tube comprising:

a cylindrical center section of a given diameter, a cylindrical end section of a lesser diameter than the cylindrical center section at the one end of the torque tube, a transition section connecting the cylindrical end section to the cylindrical center section, the transition section having an inner conical portion connected to the cylindrical center section, an outer conical portion connected to the cylindrical end section, and an annular stiffening rib that is between the inner and outer conical portions;

the drive yoke being connected to the cylindrical end section at the one end of the torque tube.

12. An automotive drive line including a drive shaft having an aluminum torque tube and a drive yoke at one end the torque tube for transmitting mechanical power, the aluminum torque tube comprising:

a cylindrical center section of a given diameter, a cylindrical end section of a lesser diameter than the given diameter of the cylindrical center section at the one end of the torque tube for attaching the drive yoke to the aluminum torque tube, a transition section connecting the cylindrical end section to the cylindrical center section, the transition section having an annular stiffening rib that is spaced from the cylindrical end section and the cylindrical center section to reduce oil canning of the transition section, the cylindrical end section and the transition section having a length, and the cylindrical center section having a length that is greater than the length of the cylindrical end section and the transition section.

13. A drive shaft for automotive vehicles having an aluminum torque tube and first and second drive yokes at opposite ends of the torque tube respectively for connecting the drive shaft in an automotive drive line for transmitting mechanical power comprising, the aluminum torque tube consisting essentially of:

a cylindrical center section of a substantially uniform diameter, a first cylindrical end section of a lesser diameter than the uniform diameter of the cylindrical center section at one end of the torque tube for attaching one of the drive yokes to one end of the aluminum torque tube, a first transition section connecting the first cylindrical end section to the cylindrical center section, the first transition section having inner and outer conical portions and an annular stiffening rib that is between the inner and outer conical portions to reduce oil canning of the first transition section, a second cylindrical end section of the lesser diameter than the uniform diameter of the substantially cylindrical center section at an opposite end of the torque tube for attaching another one of the drive yokes to the opposite end of the aluminum torque tube, a second transition section connecting the second cylindrical end section to the cylindrical center section, the second transition section having inner and outer conical portions and an annular stiffening rib that is between the inner and outer conical portions to reduce oil canning of the second transition section, the first drive yoke being a first aluminum drive yoke pressed into the first cylindrical end section and welded to the first cylindrical end section, the second drive yoke being a second aluminum drive yoke pressed into the second cylindrical end section and welded to the second cylindrical end section, the first cylindrical end section, the first transition section, the second cylindrical section and the second transition section having a length, and the cylindrical center section having a length that is greater than the length of the first cylindrical end section, the first transition section, the second cylindrical end section and the second transition section.

* * * * *